United States Patent [19]

Hisano et al.

[11] Patent Number: 4,776,027

[45] Date of Patent: Oct. 4, 1988

[54] GEOMETRIC FIGURE POSITION AND ORIENTATION DETECTION METHOD AND DEVICE

[75] Inventors: Atushi Hisano, Nagaokakyo; Kazuhiko Saka, Joyo; Toshimichi Masaki, Takatsuki; Tsukasa Yamashita, Nara, all of Japan

[73] Assignee: Omron Tateisi Electronics Co., Kyoto, Japan

[21] Appl. No.: 699,597

[22] Filed: Feb. 8, 1985

[30] Foreign Application Priority Data

Feb. 9, 1984 [JP] Japan ................................ 59-24140

[51] Int. Cl.⁴ .............................................. G06K 9/46
[52] U.S. Cl. .................................................. 382/48
[58] Field of Search ....................... 382/23, 46, 48, 61; 356/138, 375

[56] References Cited

U.S. PATENT DOCUMENTS

| | | | |
|---|---|---|---|
| 3,898,617 | 8/1975 | Kashioka | 382/48 |
| 4,435,835 | 3/1984 | Sakow | 382/48 |
| 4,450,579 | 5/1984 | Nakashima | 382/48 |
| 4,479,145 | 10/1984 | Azuma | 382/48 |

*Primary Examiner*—Leo H. Boudreau
*Attorney, Agent, or Firm*—Stevens, Davis, Miller & Mosher

[57] ABSTRACT

The position and orientation of a geometric figure are detected by sequentially producing the coordinates with respect to an orthogonal coordinate system of pixels which make up an image of the geometric figure, by singling out from these sequentially produced coordinates of these pixels the coordinates of certain characteristic pixels of these pixels which make up an image of the geometric figure, and by comparing these coordinates of these certain characteristic pixels with stored information. Preferably, the certain characteristic pixels are: that pixel, of those which have the least value of one coordinate, which has the least value of the other coordinate; that pixel, of those which have the greatest value of the one coordinate, which has the least value of the other coordinate; that pixel, of those which have the least value of the other coordinate, which has the least value of the one coordinate; and that pixel, of those which have the greatest value of the other coordinate, which has the least value of the one coordinate. A device is also disclosed for performing this method.

8 Claims, 6 Drawing Sheets

FIG. 3

| Angle θ (degree) | Pxo | | Px1 | | Pyo | | Py1 | |
|---|---|---|---|---|---|---|---|---|
| | Ixo | Jxo | Ix1 | Jx1 | Iyo | Jyo | Iy1 | Jy1 |
| 0 * 10 | Ixo(0) | Jxo(0) | Ix1(0) | Jx1(0) | Iyo(0) | Jyo(0) | Iy1(0) | Jy1(0) |
| 1 * 10 | Ixo(1) | Jxo(1) | Ix1(1) | Jx1(1) | Iyo(1) | Jyo(1) | Iy1(1) | Jy1(1) |
| ⋮ | ⋮ | ⋮ | ⋮ | ⋮ | ⋮ | ⋮ | ⋮ | ⋮ |
| K * 10 | Ixo(K) | Jxo(K) | Ix1(K) | Jx1(K) | Iyo(K) | Jyo(K) | Iy1(K) | Jy1(K) |
| ⋮ | ⋮ | ⋮ | ⋮ | ⋮ | ⋮ | ⋮ | ⋮ | ⋮ |
| 35 * 10 | Ixo(35) | Jxo(35) | Ix1(35) | Jx1(35) | Iyo(35) | Jyo(35) | Iy1(35) | Jy1(35) |

FIG. 4

| Angle θ (degree) | Px0 Py0 → | | Px0 Px1 → | | Px0 Py1 → | | Py0 Px1 → | | Py0 Py1 → | | Px1 Py1 → | |
|---|---|---|---|---|---|---|---|---|---|---|---|---|
| | dx0 | dy0 | dx1 | dy1 | dx2 | dy2 | dx3 | dy3 | dx4 | dy4 | dx5 | dy5 |
| 0 × 10 | dx0(0) | dy0(0) | dx1(0) | dy1(0) | dx2(0) | dy2(0) | dx3(0) | dy3(0) | dx4(0) | dy4(0) | dx5(0) | dy5(0) |
| --- | --- | --- | --- | --- | --- | --- | --- | --- | --- | --- | --- | --- |
| K × 10 | dx0(K) | dy0(K) | dx1(K) | dy1(K) | dx2(K) | dy2(K) | dx3(K) | dy3(K) | dx4(K) | dy4(K) | dx5(K) | dy5(K) |
| --- | --- | --- | --- | --- | --- | --- | --- | --- | --- | --- | --- | --- |
| 35 × 10 | dx0(35) | dy0(35) | dx1(35) | dy1(35) | dx2(35) | dy2(35) | dx3(35) | dy3(35) | dx4(35) | dy4(35) | dx5(35) | dy5(35) |

4,776,027

GEOMETRIC FIGURE POSITION AND ORIENTATION DETECTION METHOD AND DEVICE

BACKGROUND OF THE INVENTION

The present invention relates to a method and a device for detection of the position and orientation of a geometric figure, in particular to such a geometric figure position and orientation detection method and device which may be used as a visual sensor for an industrial robot or the like, and more particularly to such a method and device utilizing a novel technological approach to the detection of the position and the orientation of a geometric figure.

In the prior art, in order to detect the position and the orientation of a geometric figure, methods and devices based upon pattern matching and upon linear diagram analysis have been used. However, in the case of a method or a device utilizing pattern matching, it is not easy to detect the position and the orientation of the geometric figure when said geometric figure whose position and orientation are to be detected undergoes a rotational displacement; while, in the case of a method and a device utilizing linear diagram analysis, the disadvantage is incurred that it takes considerable time and computational effort to convert a geometrical figure which has been inputted into a linear diagram.

Further, in both of these cases, a memory device is required which is capable of storing one complete frame of picture image; in other words, a television camera or the like is used for looking at the geometric figure whose position and orientation are required to be detected, and then a full image as transmitted by this camera is required to be stored in high speed computer memory (i.e. RAM memory) for being subsequently processed by pattern matching and upon linear diagram analysis. However, this means that the memory is required to be quite voluminous, and this presents a cost problem in many cases.

SUMMARY OF THE INVENTION

Accordingly, it is the primary object of the present invention to provide a method and device for detecting the position and orientation of a geometric figure, which avoid the above outlined problems.

It is a further object of the present invention to provide such a method and device for detecting the position and orientation of a geometric figure, which are effective for detecting the position and the orientation of the geometric figure when said geometric figure undergoes a rotational displacement.

It is a further object of the present invention to provide such a method and device for detecting the position and orientation of a geometric figure, which can quickly perform this detection process.

It is a further object of the present invention to provide such a method and device for detecting the position and orientation of a geometric figure, which do not require a great amount of computation for the performance of this detection process.

It is a yet further object of the present invention to provide such a method and device for detecting the position and orientation of a geometric figure, which do not require a memory device so large as to be able to store one complete frame of picture image.

It is a yet further object of the present invention to provide such a method and device for detecting the position and orientation of a geometric figure, which can operate by simply processing the video signal from a sensing device such as a television camera, in an online fashion, without any need for said video signal to be stored for later processing.

It is a yet further object of the present invention to provide such a method and device for detecting the position and orientation of a geometric figure, which are efficient and speedy and can perform the detection process at low cost and with low overhead.

According to the most general method aspect of the present invention, these and other objects are accomplished by a method for detecting the position and orientation of a geometric figure, wherein: the coordinates with respect to an orthogonal coordinate system of pixels which make up an image of said geometric figure are produced sequentially; the coordinates of certain characteristic pixels of said pixels which make up an image of said geometric figure are singled out from said sequentially produced coordinates of said pixels; and, by comparison of said coordinates of said certain characteristic pixels with stored information, the position and the orientation of said geometric figure are detected. And likewise, according to the most general device aspect of the present invention, these and other objects are accomplished by a device for detecting the position and orientation of a geometric figure, comprising: a means for sequentially producing the coordinates with respect to an orthogonal coordinate system of pixels which make up an image of said geometric figure; a means for singling out from said sequentially produced coordinates of said pixels the coordinates of certain characteristic pixels of said pixels which make up an image of said geometric figure; and a means for comparing said coordinates of said certain characteristic pixels with stored information, and for thus detecting the position and the orientation of said geometric figure.

According to such a method and device, the above outlined problems are avoided, and the position and the orientation of the geometric figure are effectively detected when said geometric figure undergoes a rotational displacement. Further, this method and device for detecting the position and orientation of a geometric figure can quickly perform the detection process, and do not require a great amount of computation for the prrformance of the detection process. Also, particularly, this method and device for detecting the position and orientation of a geometric figure do not require a memory device so large as to be able to store one complete frame of picture image, because they can operate by simply processing a signal (such as a video signal which may emanate from a sensing device such as a television camera) in an online fashion, without any need for said signal to be stored for later processing. Accordingly, this method and device for detecting the position and orientation of a geometric figure are efficient and speedy and can perform the detection process at low cost and with low overhead.

Further, according to a more particular aspect of the present invention, these and other objects are more particularly and concretely accomplished by a method and a device for detecting the position and orientation of a geometric figure as outlined above, wherein said certain characteristic pixels are: that pixel, of those which have the least value of one coordinate, which has the least value of the other coordinate; that pixel, of those which have the greatest value of said one coordinate, which has the least value of said other coordinate; that pixel, of those which have the least value of said other coordinate, which has the least value of said one coordinate; and that pixel, of those which have the greatest value of said other coordinate, which has the least value of said one coordinate.

This particular selection of the characteristic pixels makes an implementation easy and simple, as will be understood from the description of the preferred embodiments of this invention which will be made hereinafter.

BRIEF DESCRIPTION OF THE DRAWINGS

The present invention will now be shown and described with reference to the preferred embodiments of the method and the device thereof, and with reference to the illustrative drawings. It should be understood, however, that the description of these method and device embodiments, and the drawings, are given purely for the purposes of explanation and exemplification only, and are not intended to be limitative of the scope of the present invention in any way, since the scope of the present invention is to be defined solely by the appended claims. In the drawings, like parts are denoted by like reference symbols in the various figures thereof, and:

FIG. 3 is a sample set of model data for use by the geometric figure position and orientation detection device according to the present invention, listing the coordinate values of said four characteristic pixels of the FIG. 2 image;

FIG. 4 is another sample set of model data for use by the geometric figure position and orientation detection device according to the present invention, listing the magnitudes of the resolved components of the six vectors linking these four pixels in the FIG. 2 image, for each value of the inclination of the image of the geometric figure in said image as spaced at an interval of 10°;

DESCRIPTION OF THE PREFERRED EMBODIMENTS

Figure 1:
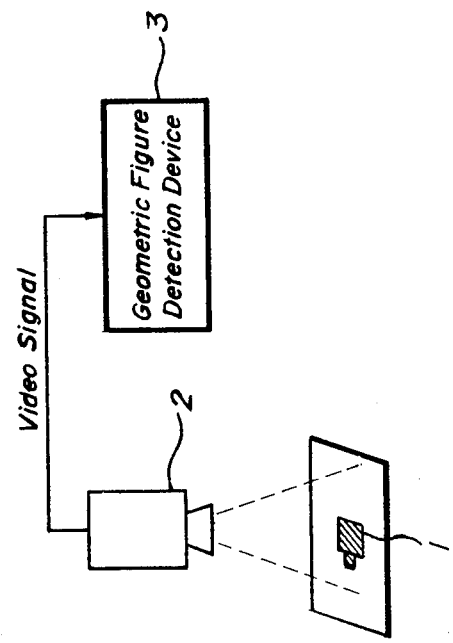
FIG. 1 is a diagrammatical figure showing the general layout of an instance of utilization of the preferred embodiment of the device for detecting the position and orientation of a geometric figure according to the present invention.

The present invention will now be described with reference to the preferred method and device embodiments thereof, and with reference to the appended drawings. FIG. 1 shows the general layout of an instance of utilization of the preferred embodiment of the device for detecting the position and orientation of a geometric figure according to the present invention, which practices the preferred embodiment of the method for detecting the position and orientation of a geometric figure according to the present invention. In this figure, the reference numeral 1 denotes a geometric figure the position and orientation of which are to be detected (which may in fact be the outline of an object) which is presented against a contrasting field, and a television camera 2 scans this geometric figure 1 and the background field and produces a video signal representative of the outline of the geometric figure 1 which it transmits to a geometric figure position and orientation detection device 3 which is the preferred device embodiment of the present invention.

Figure 2:
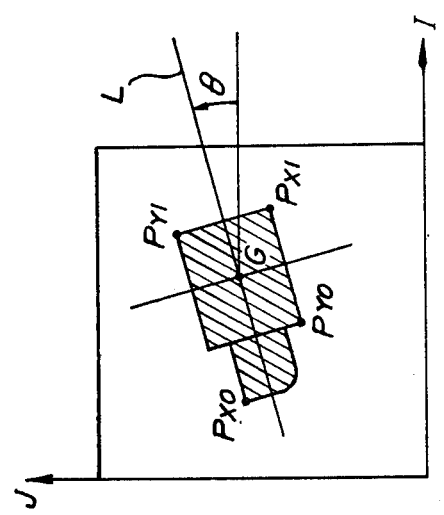
FIG. 2 shows an example of an image that may be transmitted in its video signal by a television camera of FIG. 1, as referred to orthogonal coordinates, particularly showing four characteristic pixels in said image.

In FIG. 2, an example of the image that may be transmitted by the television camera 2 in its video signal is shown by a shaded area as referred to an orthogonal coordinate system having i and j axes which is in a natural fashion defined by the horizontal and the vertical scan directions of said television camera 2. An arbitrarily predefined reference point in the geometric figure is shown as falling at a point G (with coordinates iG and jG, although these are not shown) in the image in this coordinate system, said point G thus being used for defining the translational position of the geometric figure; and an arbitrarily predefined reference line L in the geometric figure is shown as making an angle $\theta$ with the i axis in the image in this coordinate system, said angle $\theta$ thus being used for defining the rotational position of the geometric figure. It is to be particularly understood that the image shown in FIG. 2 is in fact not required to be stored in its entirety at one time anywhere in the geometric figure position and orientation detection device 3; this is a particular good feature of the present invention.

To outline broadly the method of operation, according to the preferred method embodiment of the present invention, of the device 3 which is the preferred device embodiment of the present invention: first, during the transmission of the single frame shown in FIG. 2 of the picture signal from the television camera 2, in an ongoing and online manner it determines the coordinates of four characteristic pixels PX0, PX1, PY0, and PY1 in the image of the geometric figure. These four characteristic pixels are defined as follows: PX0 is the pixel in the image of the geometric figure which has the least valued i coordinate, and in the case that two or more pixels exist with the same minimum value of i coordinate it is the one thereof which has least j coordinate; similarly, PX1 is the pixel in the image of the geometric figure which has the greatest valued i coordinate, and in the case that two or more pixels exist with the same maximum value of i coordinate it is the one thereof which has least j coordinate; PY0 is the pixel in the image of the geometric figure which has the least valued j coordinate, and in the case that two or more pixels exist with the same minimum value of j coordinate it is the one thereof which has least i coordinate; and PY1 is the pixel in the image of the geometric figure which has the greatest valued j coordinate, and in the case that two or more pixels exist with the same maximum value of j coordinate it is the one thereof which has least i coordinate. In other words, PX0 may be described as the lowermost leftmost pixel of the image of the geometric figure, while PX1 is its lowermost rightmost pixel, PY0 is its leftmost lowermost pixel, and PY1 is its leftmost uppermost pixel. The particular manner in which the coordinates of these four pixels PX0, PX1, PY0, and PY1 are determined, as one frame of the video signal is received by the geometric figure position and orientation detection device 3, will be explained hereinafter in detail.

Next, the geometric figure position and orientation detection device 3 compares the coordinates of these four pixels PX0, PX1, PY0, and PY1 with model data which have been determined in advance and stored in a memory, and by performing calculations on these data determines the coordinates (iG, jG) of the point G in the picture image, for representing the translational position of the geometric figure, and similarly determines the angle $\theta$ between the predetermined reference line L in the picture image and the i axis, for representing the rotational position of the geometric figure. These values (iG, jG) and the angle $\theta$ are then output by the device 3.

In FIGS. 3 and 4 there are shown a possible set of such model data; they are typically determined in advance by activating the television camera 2 and the geometric figure position and orientation detection device 3, while rotating an example 1 of the geometric figure whose position and oientation are to be detected under said television camera 2. The model data table of FIG. 3 lists the coordinate values (iX0, jX0) (iX1, jX1) (iY0, jY0) (iY1, jY1) of the four characteristic pixels PX0, PX1, PY0, PY1 for values of the inclination angle $\theta$ of the geometric figure spaced apart at an interval of 10°, and the model data table of FIG. 4 shows the magnitudes of the i components and of the j components of the six vectors PX0-PY0, PX0-PX1, PX0-PY1, PY0-PX1, PY0-PY1, PX1-PY1 linking these four characteristic pixels PX0, PX1, PY0, and PY1, for each inclination of the geometric figure at an interval of 10°: these values will hereinafter be referred to as iX0(k) etc., where k is the row number of the table of FIG. 4, corresponding to the value of the angle $\theta$ in units of 10°.

Figure 5:
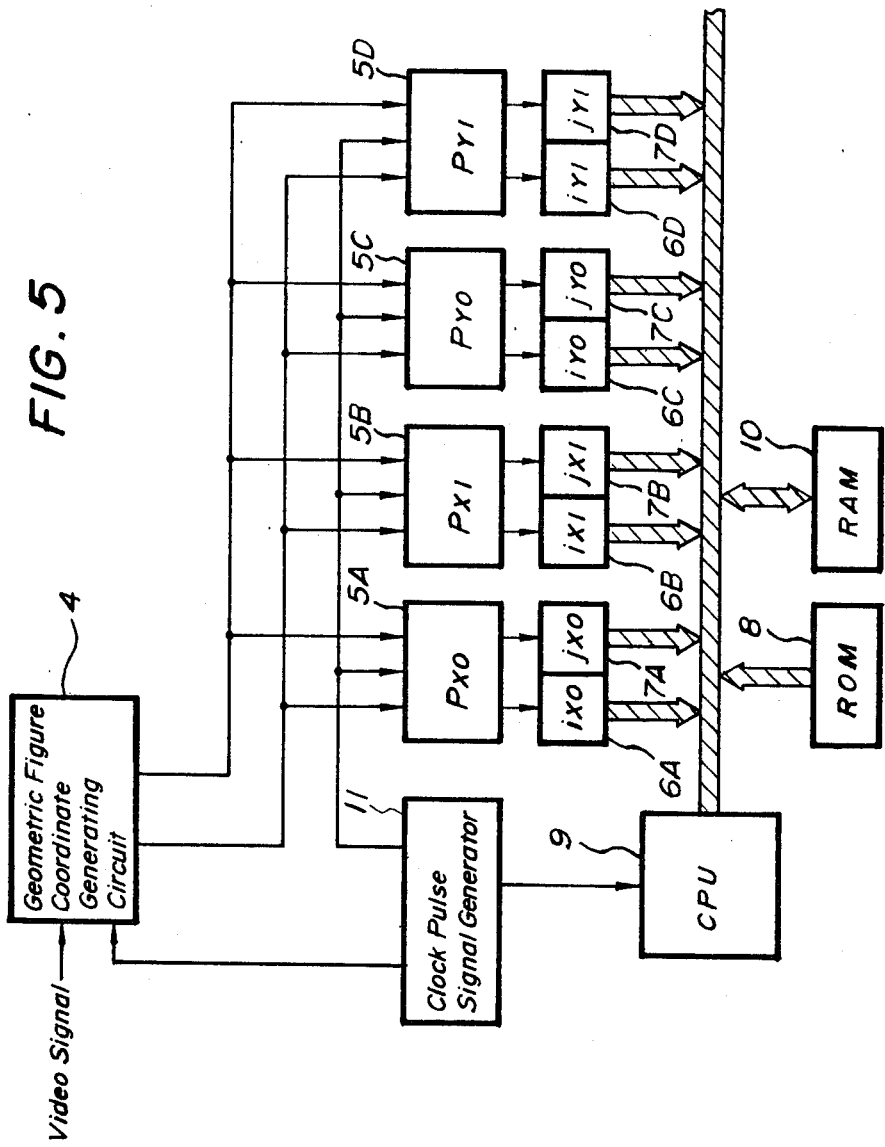
FIG. 5 is a block diagram showing the structure of the preferred embodiment of the geometric figure position and orientation detection device of FIG. 1 in more detail.

FIG. 5 shows the structure of the preferred embodiment of the geometric figure position and orientation detection device 3 as a more detailed block diagram. The reference numeral 4 denotes a geometric figure coordinate generating circuit, which converts the video signal into a stream of binary values and sequentially outputs, respectively at its I and its J terminal, binary data representing the i coordinate and the j coordinate of each of the pixels making up the image of the geometric figure (i.e. making up the darkened portion of FIG. 2) according to the orthogonal coordinate system of FIG. 2. It should be particularly noted that the geometric figure coordinate generating circuit 4 can do this without at any time storing the entire representation of a full frame of the picture signal dispatched from the television camera 2 in memory; thus, memory requirements and accordingly cost are minimized. A detailed constructional specification for this geometric figure coordinate generating circuit 4 will be easily supplemented by one of ordinary skill in the electronic art without undue experimentation, based upon the disclosures made in this specification with regard to the function of this circuit, and hence further structural details of the circuit 4 are omitted herein in the interests of brevity.

Each of the output signals of the circuit 4, i.e. the i coordinate signal, which is a stream of binary values representing in turn all the i coordinates of all the pixels in the image of the geometric figure, and the j coordinate signal, which is a stream of binary values representing in turn all the j coordinates of all the pixels in the image of the geometric figure, is supplied to each of four characteristic pixel coordinate extracting circuits 5A, 5B, 5C, and 5D, each of which picks out the particular ones of these i and j coordinate values corresponding to its corresponding one of the characteristic pixels PX0, PX1, PY0, and PY1, and stores them respectively in buffers 6 and 7. In detail, the characteristic pixel coordinate extracting circuit 5A picks out of the i coordinate signal and the j coordinate signal the coordinates of the characteristic pixel PX0 and stores them in the buffers 6A and 7A, the characteristic pixel coordinate extracting circuit 5B picks out of the i coordinate signal and the j coordinate signal the coordinates of the characteristic pixel PX1 and stores them in the buffers 6B and 7B, the characteristic pixel coordinate extracting circuit 5C picks out of the i coordinate signal and the j coordinate signal the coordinates of the characteristic pixel PY0 and stores them in the buffers 6C and 7C, and the characteristic pixel coordinate extracting circuit 5D picks out of the i coordinate signal and the j coordinate signal the coordinates of the characteristic pixel PY1 and stores them in the buffers 6D and 7D.

The contents of these buffers 6A through 6D and 7A through 7D are accessible via a bus. To this bus are also connected a ROM (read only memory) 8, which stores various programs used during the operation of the system, and a CPU (central processing unit) 9, which reads the programs and executes various computations and processes concerning the detection of the position and the orientation of the geometric figure, while reading and writing data to and from a RAM (random access memory) 10, also connected to the bus. And a clock pulse signal generating circuit 11 generates clock pulse signals which are supplied to the CPU 9, the geometric figure coordinate generating circuit 4, and the four characteristic pixel coordinate extracting circuits 5A, 5B, 5C, and 5D for synchronizing their operation.

Figure 6:
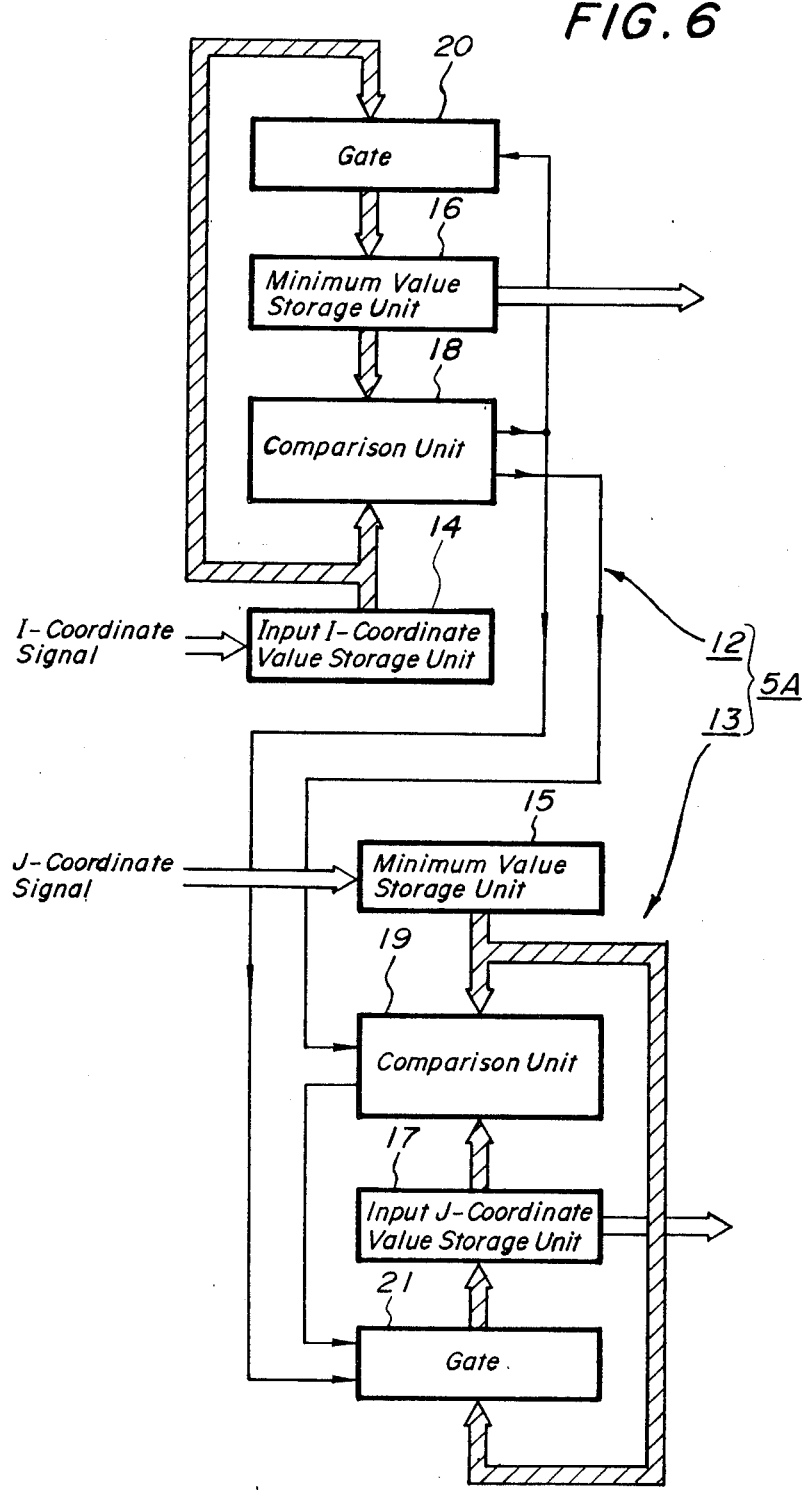
FIG. 6 is a block diagram showing the internal structure of a characteristic pixel coordinate extracting circuit, which picks out of an i coordinate signal and a j coordinate signal the coordinates of the characteristic pixel PX0 of FIG. 2 and stores them in two buffers.

Before describing the calculations performed by the CPU 9 on the coordinates of the four characteristic pixels PX0, PX1, PY0, and PY1, as stored by the four characteristic pixel coordinate extracting circuits 5A, 5B, 5C, and 5D in the buffers 6A to 6D and 7A to 7D, the functioning and the detailed internal structure of the characteristic pixel coordinate extracting circuit 5A, which picks out of the i coordinate signal and the j coordinate signal the coordinates of the characteristic pixel PX0 and stores them in the buffers 6A and 7A, will be explained, with reference to FIG. 6 which is a block diagram thereof. The other ones 5B, 5C, and 5D of the characteristic pixel extracting circuits are constructed and function in similar ways, mutatis mutandis.

This characteristic pixel coordinate extracting circuit 5A comprises two parts: a ominant part 12 which processes the i coordinate signal to produce the i coordinate of the characteristic pixel PX0, and a subordinate part 13 which processes the i coordinate signal to produce the i coordinate of said characteristic pixel PX0. Each of these parts 12 and 13 comprises: an input value storage unit, respectively 14 and 15, in which the flow of relevant coordinate data from the geometric figure coordinate generating circuit 4, i.e. respectively the i coordinate signal and the j coordinate signal, is received; a minimum value storage unit, respectively 16 and 17, in which the minimum value so far found of said relevant coordinate data is stored; a comparison unit, respectively 18 and 19, which determines whether the current value of the incoming coordinate signal is greater than the value currently stored in the minimum value storage unit 16 or 17, or not; and a gate, respectively 20 and 21, which controls the flow of data from the input value storage unit 14 or 15 to the minimum value storage unit 16 or 17. In each of the dominant circuit part 12 and the subordinate circuit part 13, the comparison unit controls the gate; but in addition the comparison unit 18 of the dominant circuit part 12 controls the operation of the comparison unit 19 of the subordinate circuit part 13 and also of the gate 21 of said subordinate circuit part 13.

The operation of this circuit 5A is as follows. First of all, the maximum possible values of the i coordinate and of the j coordinate are set up in the minimum value storage units 16 and 17 as initial data. Next, as the i coordinate signal and the j coordinate signal are inputted from the geometric figure coordinate generating circuit 4, each successive value of the i coordinate signal is stored in the input value storage unit 14 of the dominant circuit part 12, while correspondingly each successive value of the j coordinate signal is stored in the input value storage unit 15 of the subordinate circuit part 13. And next, in the dominant circuit part 12, the comparison unit 18 compares this current value of the i coordinate signal stored in the input value storage unit 14 with the lowest yet found value of the i coordinate signal stored in the minimum value storage unit 16, and, if this new current value in the unit 14 is now less than or equal to the lowest yet found value stored in the unit 16, then the comparison unit 18 opens the gate 20, so as to cause the lowest yet found value stored in the unit 16 to be set to the new current value in the unit 14, i.e. to be updated. Thus, over the whole operation of the television camera 2 to transmit one frame of picture signal, at the end of this operation the value in the minimum value storage unit 16 is set to the i coordinate of that pixel which has the lowest i coordinate value, i.e. to the i coordinate of the pixel PX0 of FIG. 2. Meanwhile, the signal from the comparision unit 18 of the dominant circuit part 12 for controlling the gate 20 of this part is also sent to the gate 21 of the subordinate circuit part 13, and thus this gate 21 has the possibility of being opened, only when the minimum value of the i coordinate yet found is being updated in the minimum value storage unit 16. At each of these times, in a similar fashion to that outlined above with respect to the i coordinate, but this time with respect to the j coordinate, in this subordinate circuit portion 13, the comparison unit 19 compares this current value of the j coordinate signal stored in the input value storage unit 15 with the lowest yet found value of the j coordinate signal stored in the minimum value storage unit 17, and, if this new current value in the unit 15 is now less than or equal to the lowest yet found value stored in the unit 17, then the comparison unit 19 opens the gate 21, so as to cause the lowest yet found value stored in the unit 17 to be set to the new current value in the unit 15, i.e. to be updated. Thus, over the whole operation of the television camera 2 to transmit one frame of picture signal, at the end of this operation the value in the minimum j coordinate value storage unit 17 is set to the j coordinate of that one of all the pixels which have the lowest i coordinate value which has the lowest j coordinate value, i.e. to the j coordinate of the pixel PX0 of FIG. 2.

The other ones 5B, 5C, and 5D of the characteristic pixel extracting circuits are constructed and function in similar ways to that described above for the circuit 5A, except that: in the characteristic pixel extracting circuit 5B, which is for picking out of the i coordinate signal and the j coordinate signal the coordinates of the characteristic pixel PX1, the dominant circuit part has a comparison unit which tests for the relation of being greater than or equal to, rather than for the relation of being less than or equal to; in the characteristic pixel coordinate extracting circuit 5C, which is for picking out of the i coordinate signal and the j coordinate signal the coordinates of the characteristic pixel PY0, the dominant circuit part receives input of the j coordinate signal and the subordinate circuit part receives input of the i coordinate signal; and in the characteristic pixel coordinate extracting circuit 5D, which is for picking out of the i coordinate signal and the j coordinate signal the coordinates of the characteristic pixel PY1, the dominant circuit part receives input of the j coordinate signal and the subordinate circuit part receives input of the i coordinate signal, and also the dominant circuit part has a comparison unit which tests for the relation of being greater than or equal to, rather than for the relation of being less than or equal to.

Figure 7:
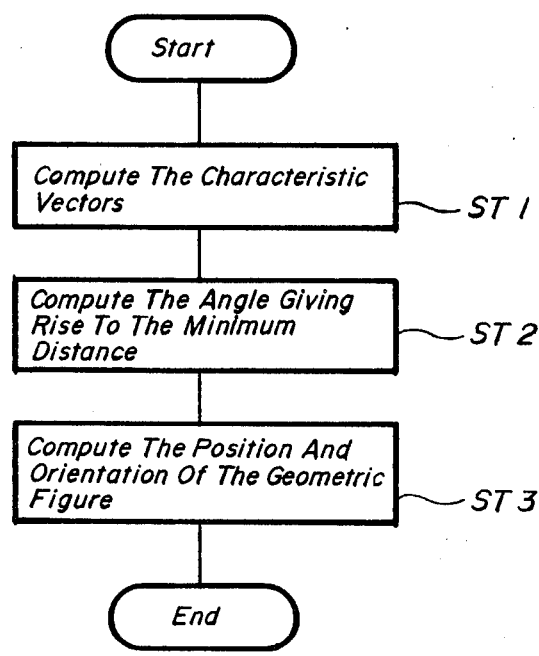
FIG. 7 is a flow chart of the operation of a central processing unit included in the block diagram of FIG. 5, as the preferred embodiment of the device of the present invention detects the position and orientation of a geometric figure according to the preferred method embodiment of the present invention.

The CPU 9 performs the following calculations on the coordinates of the four characteristic pixels PX0, PX1, PY0, and PY1, as stored by the four characteristic pixel coordinate extracting circuits 5A, 5B, 5C, and 5D in the buffers 6A to 6D and 7A to 7D, according to the flow chart of its operation shown in FIG. 7.

First, in the step ST1 of FIG. 7, the CPU 9 generates a characteristic twelve dimensional vector V from the coordinates of the four characteristic pixels PX0, PX1, PY0, and PY1, as follows:

$$\vec{V} = (iY0 - iX0, jY0 - jX0, iX1 - iX0, jX1 - jX0, iY1 - iX0,$$

$$jY1 - jX0, iX1 - iY0, jX1 - jY0, iY1 - iY0, jY1 - jY0,$$

$$iY1 - iX1, jY1 - jX1)$$

Next, the CPU 9 also generates a similar characteristic twelve dimensional vector VM(k) for each of the sets of model data as shown in FIG. 4, for each value of k from 0 to 35, as follows:

$$\vec{V}_M(k) = (dx0(k), dy0(k), dy1(k), dx2(k), dy2(k),$$
$$dx3(k), dy3(k), dx4(k), dy4(k), dx5(k), dy5(k))$$

Next, in the step ST2 of FIG. 7, the CPU 9 computes the distance between the thus calculated characteristic vector V of the actually measured coordinates of the four characteristic pixels PX0, PX1, PY0, and PY1, and each of the characteristic twelve dimensional vectors VM(k) described above for the model data sets, as follows:

$$D(k) = |\vec{V} - \vec{V}_M(k)|$$

and, by scrutinizing these values of D(k), the CPU 9 selects that value m of k which gives rise to the minimum such distance D(k).

Next, in the step ST3 of FIG. 7, the CPU 9 performs the following calculation to determine the position (i.e. the coordinaqtes iG and jG of the point G) and the orientation (i.e. the angle θ) of the geometric figure:

$$iG =$$

-continued $$iG = \frac{iX0 - IX0(k_m)\frac{(iY0 - iX0)dx0(k_m) + (jY0 - jX0)dy0(k_m)}{dx^20(k_m) + dy^20(k_m)} + JX0(k_m)\frac{(jY0 - jX0)dx0(k_m) - (iY0 - iX0)dy0(k_m)}{dx^20(k_m) + dy^20(k_m)}}{jX0 - IX0(k_m)\frac{(jY0 - jX0)dx0(k_m) - (iY0 - iX0)dy0(k_m)}{dx^20(k_m) + dy^20(k_m)} - JX0(k_m)\frac{(iY0 - iX0)dx0(k_m) + (jY0 - jX0)dy0(k_m)}{dx^20(k_m) + dy^20(k_m)}}$$

$$\cos\theta = \frac{(iY0 - iX0)dx0(k_m) + (jY0 - jX0)dy0(k_m)}{dx^20(k_m) + dy^20(k_m)}$$

$$\sin\theta = \frac{(jY0 - jX0)dx0(k_m) - (iY0 - iX0)dy0(k_m)}{dx^20(k_m) + dy^20(k_m)}$$

The significance of these calculations will be clear to one of ordinary skill in the mathematical art, based upon the disclosure herein, and hence will not be enlarged upon, in the interests of brevity of explanation.

Thus, in conclusion, it is seen that according to the present invention there are provided a method and device which enable the problems outlined in the preamble to this specification to be avoided, and it is seen that the position and the orientation of the geometric figure are effectively detected when said geometric figure undergoes a rotational displacement. Further, this method and device for detecting the position and orientation of a geometric figure can quickly perform the detection process, and do not require a great amount of computation for the performance of the detection process. Also, particularly, this method and device for detecting the position and orientation of a geometric figure do not require any memory device so large as to be able to store one complete frame of picture image, because they can operate by simply processing a signal such as a video signal which may emanate from a sensing device such as a television camera in an online fashion, without any need for said signal to be stored for later processing. Accordingly, this method and device for detecting the position and orientation of a geometric figure are efficient and speedy and can perform the detection process at low cost and with low overhead.

Although the present invention has been shown and described with reference to the preferred method and device embodiments thereof, and in terms of the illustrative drawings, it should not be considered as limited thereby. Various possible modifications, omissions, and alterations could be conceived of by one skilled in the art to the form and the content of any particular embodiment, and therefore it is desired that the scope of the present invention and of the protection sought to be granted should be defined, not by any of the details of the shown preferred embodiments or of the drawings, but solely by the scope of the appended claims, which follow.

What is claimed is:

1. A method for detecting the position and orientation of a geometric figure, comprising:
   sequentially producing pixel coordinates with respect to an orthogonal coordinate system of pixels which make up an image of said geometric figure;
   identifying special coordinates of said pixel coordinates; and
   comparing said coordinates of said certain characteristic pixels with stored information to detect the position and the orientation of said geometric figure, wherein said certain characteristic pixels are: that pixel, of those which have the least value of one coordinate, which has the least value of the other coordinate; that pixel, of those which have the greatest value of said one coordinate, which has the least value of said other coordinate; that pixel, of those which have the least value of said other coordinate, which has the least value of said one coordinate; and that pixel, of those which have the greatest value of said other coordinate, which has the least value of said one coordinate.

2. A method of detecting the position and orientation of a geometric figure according to claim 1, wherein said stored information is determined by previously, for various orientations: orienting an example of said geometric figure, likewise sequentially producing the coordinates with respect to said orthogonal coordinate system of the pixels which make up the image of said geometric figure; and singling out the coordinates of said certain charcteristic pixels of said image making up pixels from said sequentially produced coordinates.

3. A method for detecting the position and orientation of a geometric figure according to claim 1, wherein a video signal is produced which is representative of the image of said geometric figure, and the coordinates with respect to said orthogonal coordinate system of said pixels which make up said image of said geometric figure are produced sequentially by sampling said video signal in synchronization with a clock pulse signal.

4. A method for detecting the position and orientation of a geometric figure according to claim 1, wherein said stored information is stored in tabular form.

5. A device for detecting the position and orientation of a geometric figure, comprising:
   a means for sequentially producing the coordinates with respect to an orthogonal coordinate system of pixels which make up an image of said geometric figure;
   a means for singling out from said sequentially produced coordinates of said pixels that coordinates of certain characteristic pixels of said pixels which make up an image of said geometric figure; and
   a means for comparing said coordinates of said certain characteristic pixels with stored information, and for thus detecting the position and the orientation of said geometric figure, wherein said certain characteristic pixels are: that pixel, of those which have the least value of one coordinate, which has the least value of the other coordinate; that pixel, of those which have the greatest value of said one coordinate, which has the least value of said other coordinate, that pixel, of those which have the least value of said other coordinate, which has the least value of said one coordinate; and that pixel, of those which have the greatest value of said other coordinate, which has the least value of said one coordinate.

6. A device for detecting the position and orientation of a geometric figure according to claim 5, wherein said stored information is determined by previously, for various orientations: orienting an example of said geometric figure, likewise sequentially producing the coordinates with respect to said orthogonal coordinate system of the pixels which make up the image of said geometric figure, by said sequential production means; and singling out the coordinates of said certain characteristic pixels of said image making up pixels from said sequentially produced coordinates, by said singling out means.

7. A device for detecting the position and orientation of a geometric figure according to claim 5, further comprising a means for producing a video signal which is representative of the image of said geometric figure, and wherein the coordinates with respect to said orthogonal coordinate system of said pixels which make up said image of said geometric figure are produced sequentially, by said sequential production means, by sampling said video signal in synchronization with a clock pulse signal.

8. A device for detecting the position and orientation of a geometric figure according to claim 5, wherein said stored information is stored in tabular form.

* * * * *